(12) United States Patent
Freeburg (10) Patent No.: US 7,236,766 B2
(45) Date of Patent: Jun. 26, 2007

(54) FILTERED WIRELESS COMMUNICATIONS (75) Inventor: Thomas A. Freeburg, St. Charles, IL (US)

(73) Assignee: Tylu Wireless Technologies, Inc., Chicago, IL (US)

( * ) Notice: Subject to any disclaimer, the term of this patent is extended or adjusted under 35 U.S.C. 154(b) by 70 days.

(21) Appl. No.: 11/095,867

(22) Filed: Mar. 31, 2005

(65) Prior Publication Data

US 2006/0223491 A1 Oct. 5, 2006

(51) Int. Cl.
H04M 11/04 (2006.01)

(52) U.S. Cl. ............ 455/404.1; 455/445; 455/450

(58) Field of Classification Search ............ 455/404.1, 455/445, 450, 509, 428; 370/229, 330, 431
See application file for complete search history.

(56) References Cited

U.S. PATENT DOCUMENTS

| | | | |
|---|---|---|---|
| 5,235,633 A | | 8/1993 | Dennison et al. |
| 5,844,522 A | * | 12/1998 | Sheffer et al. ............ 342/457 |
| 5,875,211 A | * | 2/1999 | Cooper ..................... 375/213 |
| 5,966,655 A | | 10/1999 | Hardouin |
| 6,011,973 A | | 1/2000 | Valentine et al. |
| 6,085,096 A | | 7/2000 | Nakamura |
| 6,128,485 A | | 10/2000 | Mori et al. |
| 6,131,045 A | | 10/2000 | Iwata |
| 6,181,933 B1 | | 1/2001 | Jeong |
| 6,195,529 B1 | | 2/2001 | Linz et al. |
| 6,201,973 B1 | | 3/2001 | Kowaguchi |
| 6,243,583 B1 | * | 6/2001 | Tsutsui et al. ............ 455/442 |
| 6,253,086 B1 | | 6/2001 | Parantainen et al. |
| 6,343,212 B1 | | 1/2002 | Weber et al. |
| 6,393,254 B1 | | 5/2002 | Pousada Carallo et al. |
| 6,438,385 B1 | | 8/2002 | Heinonen et al. |
| 6,456,822 B1 | | 9/2002 | Gofman et al. |
| 6,496,703 B1 | | 12/2002 | da Silva |
| 6,625,455 B1 | | 9/2003 | Ariga |
| 6,687,506 B1 | | 2/2004 | Girod |
| 6,718,175 B1 | | 4/2004 | Edstam |
| 6,782,266 B2 | | 8/2004 | Baer et al. |
| 6,823,199 B2 | | 11/2004 | Gough |
| 6,832,093 B1 | | 12/2004 | Ranta |
| 6,885,845 B1 | | 4/2005 | Crowley et al. |
| 6,907,254 B1 | | 6/2005 | Westfield |
| 6,937,868 B2 | | 8/2005 | Himmel et al. |
| 6,944,426 B1 | | 9/2005 | Esser et al. |
| 6,978,146 B1 | | 12/2005 | Yardman |
| 7,043,260 B2 | | 5/2006 | Kim |
| 2001/0036821 A1 | | 11/2001 | Gainsboro et al. |
| 2006/0218229 A1 | * | 9/2006 | Pandey et al. ............ 709/203 |
| 2007/0004404 A1 | * | 1/2007 | Buckley et al. ............ 455/434 |

* cited by examiner

Primary Examiner—CongVan Tran
(74) Attorney, Agent, or Firm—Paul E Schaafsma; NovusIP, LLC (57) ABSTRACT In accordance with the principles of the present invention, a method and apparatus for filtered wireless communications is provided. The method provides a filtered wireless zone. Signaling channels normally serving a geographic vicinity are scanned, with the channel identity and the system identity of each signaling channel recorded. A transmitter-receiver is commanded to such channel. A signaling channel marker is radiated. A new signaling channel assignment message is sent, sending handsets to a new capture channel. An appropriate signal is radiated to keep the handsets locked to the new capture channel. The transmitter-receiver then ceases radiating on the first channel, and proceeds to the second external signaling channel previously recorded. The transmitter-receiver repeats this process for all the external signaling channels previously located.

48 Claims, 3 Drawing Sheets

FILTERED WIRELESS COMMUNICATIONS

FIELD OF THE INVENTION

The invention relates generally to the field of telecommunications, and more specifically to the field of wireless communication, for example, cellular telephones.

BACKGROUND OF THE INVENTION

The present invention pertains in general to the planning and deployment of cells in a cellular telephone network, and more particularly, to filtering the operation of cellular telephones in well delineated geographical areas. While the embodiment described herein is directed to cellular phones, the principles of the present invention apply to all types of wireless communication devices such as cellular phones, personal digital assistants, beepers, pagers, portable computers, and other wireless communication devices.

Today mobile telephones are becoming more and more frequent. The use of mobile telephones has in many regards facilitated the daily life for many people. For instance, cellular phones offer convenience in personal relationships and business dealings, by allowing users to stay in communication with the world in practically any public location. However, one person's convenience can be another person's annoyance.

For example, in some places the use of mobile telephones is not appreciated and in some places even prohibited. Often, cellular phones ring and phone conversations occur, in some of the most inappropriate locations. For example, the peaceful enjoyment of a movie, play or musical performance can be destroyed by the "ringing" of cellular phones in the audience. The concentration of students taking an exam or listening to a lecture can be broken by a cellular phone's ringing, or by another student's engagement in a conversation on a cellular phone. Also, a cellular phone can be disturbing to the public, and embarrassing to the cellular phone's owner, during church services, dining at a restaurant or during quiet times observed in public, such as opening prayers, the Pledge of Allegiance, and the National Anthem. The same applies to other locations such as for example, courtrooms, libraries, theaters, meeting rooms, conference rooms or any other location that radio frequency transmissions might be disruptive to persons or equipment in the vicinity.

Often certain locations have restrictions, rules or laws forbidding the operation of cellular phones. For example, hospitals attempt to prohibit use of cellular telephones because of the risk that the transmissions from the cellular telephone could interfere with electronic medical equipment. Also, the use of cellular telephones is currently prohibited in an airplane while the airplane is preparing for take-off since transmissions from the cellular telephone could interfere with the operation of the airplane. Although cellular telephone network providers can attempt to locate cell sites away from prohibited locations such as airport runways, it is unlikely that cellular telephone service can be excluded from the geographical location of the airport runway while at the same time providing service to geographical areas adjacent to the runway. Also, some schools forbid students to use cellular phones or beepers on school grounds, in order to reduce the likelihood of drug trafficking and gang activity.

Therefore, there is a perceived need for a mobile telephone system that minimizes or completely removes the possibility to use a mobile telephone in certain restricted areas.

In order to solve this problem a number of different solutions have been proposed. In one approach, the goal is to eliminate the disturbance caused by a mobile station located in a certain area. One type of such approach simply eliminates or "blocks" signals in a given area by, for example, generating and radiating a magnetic field pattern, which includes a command signal, which commands a transmission interruption to a radio communication terminal. Another type of such system provides the mobile station with a control, which mutes the mobile station upon receiving a particular message transmitted from a transmitting station provided in the certain area.

In another approach, the goal is to notify the user of the restricted area. Thus, in one type of such approach a base station 151 in a mobile telecommunication network is provided with a message transmission function that is installed near the place where use of a mobile telephone is restricted. When a mobile unit enters the area managed by the base station 151 having the message transmission function, a message is transmitted from the base station 151 to the mobile unit instructing the mobile unit to turn off a power supply for the mobile unit.

While the use of these "blocking" systems has gained support in certain jurisdictions, such blocking systems cannot be utilized in the United States. This is because cellphone jamming runs afoul of the Federal Communications Commission, whose approval is required for devices that send signals over the air. In particular, the operation of transmitters designed to jam or block wireless communications is a violation of the Communications Act of 1934 ("Act"). See 47 U.S.C. § 301, 302a, 333. The Act prohibits any person from willfully or maliciously interfering with the radio communications of any station licensed or authorized under the Act or operated by the U.S. government. 47 U.S.C. § 333. The manufacture, importation, sale or offer for sale, including advertising, of devices designed to block or jam wireless transmissions is prohibited. 47 U.S.C. § 302a(b). Parties in violation of these provisions may be subject to the penalties set out in 47 U.S.C. § 501–510. Fines for a first offense can range as high as $11,000 for each violation or imprisonment for up to one year, and the device used may also be seized and forfeited to the U.S. government. Likewise, certain jurisdictions outside the United State prohibit use of jamming systems.

SUMMARY OF THE INVENTION

A method and apparatus for filtered wireless communications is provided. A filtered wireless zone is provided. Signaling channels normally serving a geographic vicinity are scanned, with the channel identity and the system identity of each signaling channel recorded. A transmitter-receiver is commanded to such channel. A signaling channel marker is radiated. A new signaling channel assignment message is sent, sending handsets to a new capture channel. An appropriate signal is radiated to keep the handsets locked to the new capture channel. The transmitter-receiver then ceases radiating on the first channel, and proceeds to the second external signaling channel previously recorded. The transmitter-receiver repeats this process for all the external signaling channels previously located.

Thus, when a handset is captured a call for that handset will be routed to the voice-mail or other processing, as previously configured for that handset. Also, when a handset that has been so captured attempts to place a call, an all trunks busy message is sent, thereby blocking the call attempt Still further, if an emergency call is made, the call is routed to an emergency call line.

DETAILED DESCRIPTION OF AN EMBODIMENT OF THE INVENTION

In the planning and deployment of a cellular telephone network, the geographical service area to be covered by the cellular telephone network is partitioned into a plurality of cells. While in operation, a cellular telephone continually compares received signal strengths from base stations in cells adjacent to the cellular telephone. Typically, the cellular telephone establishes communication with the base station having the strongest signal. As the cellular telephone moves about the service area. Signal strengths from the base stations vary and eventually the cellular telephone reselects a new base station or, if on call, is handed-off from the current base station servicing the cellular telephone to a base station now having a stronger signal.

Conventionally, when a power ON operation is carried out for the portable telephone set within a service area, a position registration process of the telephone is performed for a database used for position management and located in the network. In other words, a position registration request is made from the portable telephone set to a position management server via a public base station, and the position registration server informs, after its registration, the portable telephone set of its position registration reception.

Cellular units are directed or "listen" automatically to predetermined control frequencies, while they are in the standby mode. The control is two-way full duplex, such that there are a plurality of forward control channels (FCC) from the cell to the portable unit (uplink), and a plurality of reverse control channels (RCC) from the telephone to the cell (downlink). The cellular units automatically adjust to the best of these channels available in the cell or sector.

In one of two possibilities in establishing a cellular conversation, the subscriber initiates a conversation from the cellular unit to any telephone subscriber. In this case, the destination subscriber number is dialed and the send button is pressed, and this begins a handshake routine opposite the local cellular cell, which provides service in a given area. The call handling is then passed to an area cellular mobile telephone switch office (MTSO), which checks the information, performs a verification that the subscriber is operating properly, and is entitled to receive service and then connects to the destination subscriber. This process is known as "call setup".

In the second possibility, the cellular system receives a request to establish a conversation with a cellular subscriber, and the area cellular MTSO performs a subscriber locate/search activity by sending a "search call" to all the cellular cells (connected to it) and then broadcast it on their control frequencies. The destination subscribers (when in a standby mode) which are tuned to the local control frequency, respond to the search call and this begins a handshake routine with the area cellular MTSO. When finished, the system assigns a pair of specific frequencies, a forward control channel (FCC) from the cell to the portable unit, and a reverse control channel (RCC) from the telephone to the cell, in full duplex mode, to which the telephone and cell are tuned. Only after this, a ring command is broadcast to the telephone, activating the cellular subscriber's ringing unit, and this clears the way for a full conversation.

Figure 1:
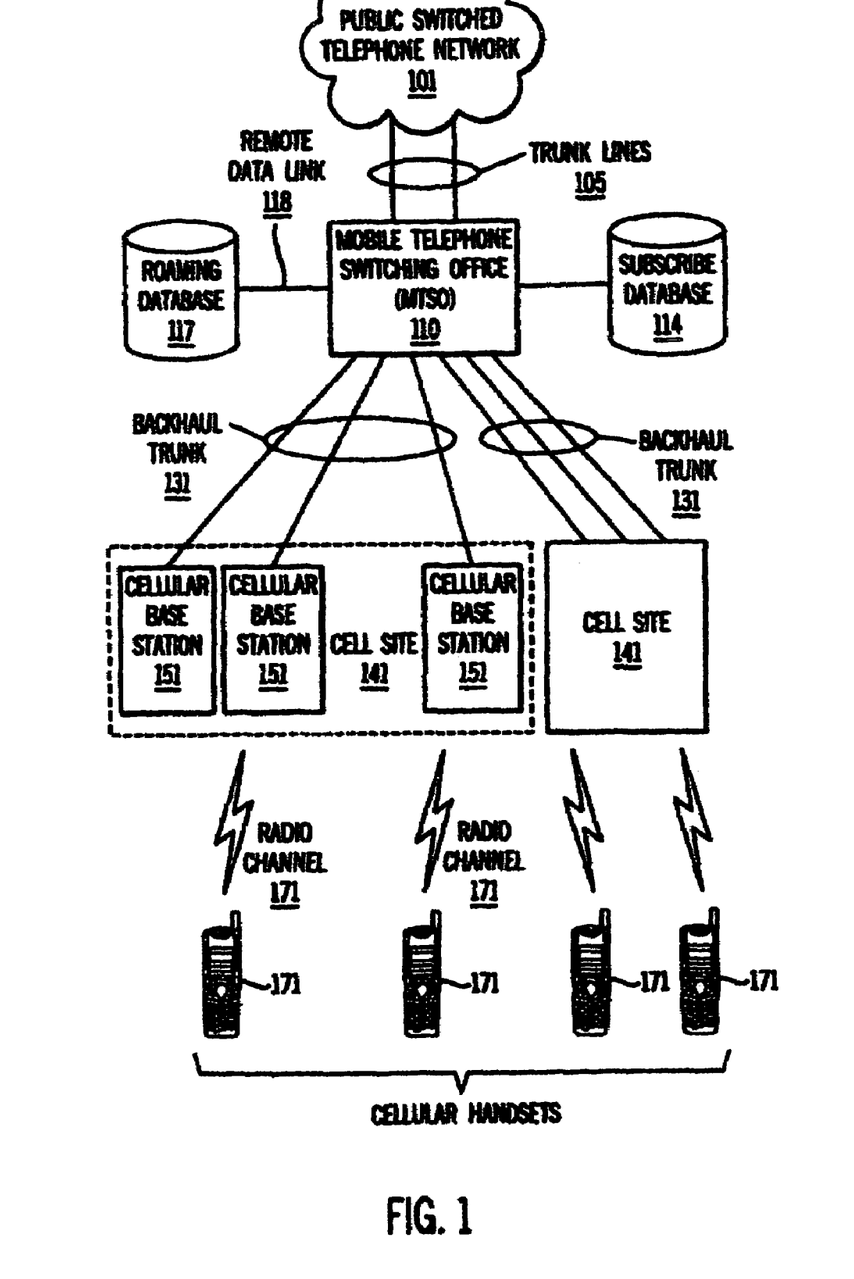
FIG. 1 is a diagram of an example cellular telephone network.

More particularly, referring to FIG. 1 an example cellular telephone network is diagramed. As previously described, a typical cellular telephone network consists of a MTSO 110 connected on one side to the Public Switched Telephone Network (PSTN) 101 via trunk lines 105, and on the other side to a series of cell sites 141 via backhaul trunks 131. Associated with the MTSO 110 is a Subscriber Data Base 114, which stores information relating to subscribers normally associated with that particular MTSO 110. While multiple elements are described herein, for ease of description like reference numerals are utilized.

There is also a Remote Data Link 118 to a Roaming Data Base 117, which is usually a distributed data base residing in a number of other MTSOs. In this way, as will be described, handsets registering to the MTSO 110 may be defined as either home, that is, normally located within the area controlled by the particular MTSO 110, or roaming, that is, normally located within the area controlled by another MTSO 110. Handsets not found in either database are normally denied any service.

Each cell site consists of a series of Cellular Base Stations 151. The Cellular Base Stations 151 in turn communicate via radio channels 161 to a number of handsets 171 (or mobile installations). The radio channels 161 may be defined not only by specific radio frequencies and bandwidths, but in the case of modern systems by particular time slot assignments in a Time Division Multiplex (TDM) scheme, and/or by differing spreading codes in a Code Division Multiple Access (CDMA) plan, as is understood by one skilled in the art.

Figure 2:
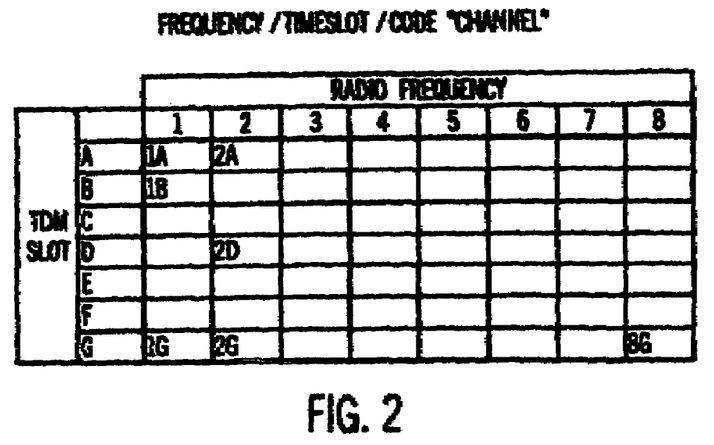
FIG. 2 is a radio channel assignment matrix.

Referring now to FIG. 2, a Radio Channel Assignment matrix is shown. In FIG. 2, the various radio frequencies available in a single cell are shown along the top of the chart, numbered 1,2,3, . . . 8; the various TDM time-slot assignments are shown along the left side, designated A, B, . . . G. Therefore, for example, the channel corresponding to the upper left box in the chart consists of TDM slot A within frequency 1, and might be designated as "1A". Likewise, for example, the channel corresponding to the box to the right of the upper left box in the chart consists of TDM slot A within frequency 2, and might be designated as "2A". Similarly, for example, the channel corresponding to the box under the upper left box in the chart consists of TDM slot B within frequency 1, and might be designated as "1B". The other channels available would be similarly labeled with their corresponding frequency and TDM slot identifiers, as shown in the chart. Also, each such radio channel consists of two distinct parts: a downlink part for communications from the base station 151 to the handset 171, and an uplink part for communications from the handset 171 to the base station 151.

In order to allow land-to-mobile calls to be sent to any of the handsets 171, the MTSO 110 designates a channel in each cell site as a "signaling channel". That channel repeatedly transmits on the downlink part a specific data sequence called the signaling channel marker, and all handsets 171 search for that sequence. In the case where a handset 171 may be able to receive signaling channels from more than one cell site, the handset 171 scans all available signaling channels and chooses the strongest signaling channel for the next step in the protocol process.

After a given handset 171 has selected a signaling channel, the handset 171 notifies the MTSO 110 that the handset 171 is available for receiving calls. The handset 171 does this by transmitting on the uplink part of the signaling channel a registration request message. The MTSO 110 searches for the subscriber data first in its own Subscriber Data Base 114, and if found returns a home registration acceptance message to the handset 171. If the handset 171 is not found in the local Subscriber Data Base 114, the MTSO 110 initiates a search of the Roaming Data Base 117. If the handset 171 is found in the Roaming Data Base 117 the MTSO 110 both sends a roaming registration acceptance message to the handset 171 and notifies the handset's home MTSO 110 of the handsets 171 location so that calls to the handset 171 may be forwarded to the proper MTSO 110.

When a call for a particular handset 171 arrives at the MTSO 110, the call sends a ring message to handset 171 via the cell site and signaling channel to which the handset 171 registered, as described above. Then handset 171 replies with a call acknowledgement message on the signaling channel, and then the MTSO 110 sends a voice channel assignment message to the handset 171. The handset 171 then switches to the assigned channel, and the voice connection is completed.

When a handset 171 places a call, the handset sends a call placement request message (usually including the called telephone number) to the MTSO 110. The MTSO 110 places the call to the PSTN 101, and at the same time sends a voice channel assignment message to the handset 171, which switches to the assigned channel to complete the voice connection.

For any of several reasons, the handset 171 may decide that the received signal strength of the current signaling channel is insufficient. This may be due for example to the handset 171 location changing to a less advantageous location for the particular cell site chosen earlier, or a number of other factors. When the received signal strength of the current signaling channel is insufficient, the handset 171 searches for a new signaling channel, sampling the signal strength of all available signaling channels as described above before making a new choice. There may also be situations where the MTSO 110 decides to assign a different signaling channel within a particular cell site. In this case, there is the facility for the MTSO 110 to send a new signaling channel assignment message to all handsets 171 registered to the existing signaling channel. This message contains the identity of the new signaling channel, and all the registered handsets 171 immediately switch to the new channel.

A given MTSO 110, usually belonging in one metropolitan area to a given cellular service provider, will, as described above, control several cell sites 141, and more than one of these cell sites 141 may be received by a given handset 171. In this case, the handset 171 chooses which site to register with by the strongest-signal method described above. There may also be multiple MTSOs in a metropolitan or geographic vicinity, belonging to various cellular service providers, within range of a given handset 171. In this case, the handset 171 normally searches first for cell sites 141 belonging to the MTSO 110 (and therefore the cellular service provider) with which the handset 171 is registered; failing to find one such 'home' site, the handset 171 searches by signal strength, and attempts to register with the strongest 'non-home' MTSO 110. In some instances, the MTSO 110 associated with the cell site so selected may decline to offer service to the handset 171; in that instance, the handset 171 normally attempts to register with another 'non-home' MTSO 110.

As an alternative to the requirement that the local signaling channel be substantially stronger than that utilized by the MTSO, in one embodiment it is possible to implement a "signaling channel priority" structure. In this method, the data stream emitted by each signaling channel would include a priority flag; that from the MTSO would be assigned a low priority, say '2', while that from the local filtered system would be assigned a higher priority, say '1'. The handset would search first for the strongest signaling channel of the highest priority, and would only go on to search for lower-priority channels in the event that a high-priority one was not available. In this manner, it can be assured that the handset will lock onto the signaling channel in the filtered zone, and not that from the MTSO, even in the case where the signal from the former is not substantially stronger than that from the latter.

Figure 3:
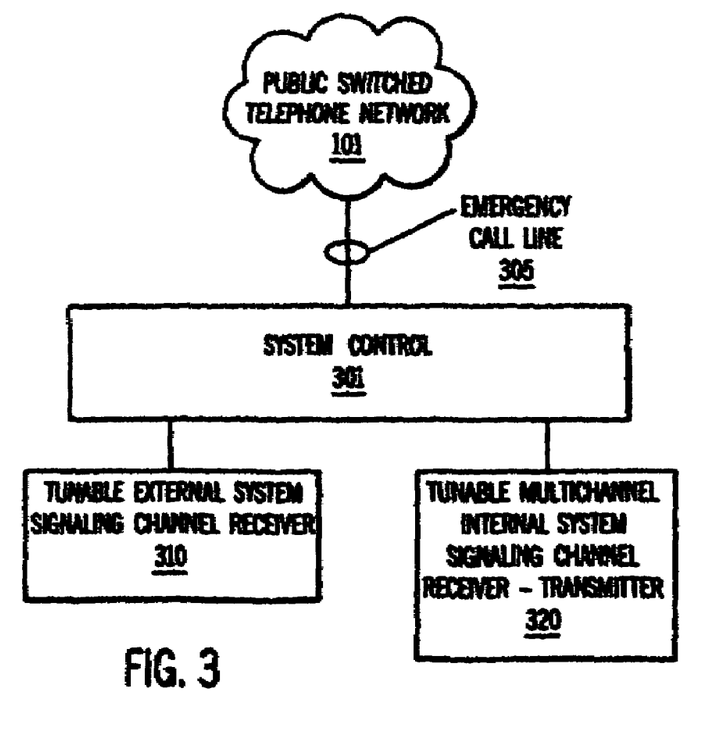
FIG. 3 shows a filtered wireless zone in accordance with the principles of the present invention.

Referring to FIG. 3, a block diagram is shown that describes an embodiment of a filtered wireless zone in accordance with the principles of the present invention. A system in accordance with the present invention can comprises a system control 301, connected to a signaling channel receiver 310 and a system signaling channel transmitter-receiver 320. The signaling channel receiver 310 is located outside the filtered wireless zone while the system signaling channel transmitter-receiver 320 is located within the filtered wireless zone. External signaling channel receiver 310 is arranged so that signaling channel receiver 310 may receive the previously described signaling channel of cell sites 141 (from any MTSO 110) in the geographic vicinity. Internal system signaling channel transmitter-receiver 320 is arranged so that system signaling channel transmitter-receiver 320 covers the filtered wireless zone. The system signaling channel transmitter-receiver 320 provides a radio-frequency (RF) signal strength substantially higher than any RF signal strength that may be possibly received from any cell site belonging to the MTSOs normally serving that locality in the filtered wireless zone. Achieving a higher RF signal strength higher may be accomplished by known RF propagation techniques, and may be extended if necessary by using several Tunable Internal System Signaling Channel Transmitter-Receivers, as will be familiar to one skilled in the art of cellular system design.

In operation, system control 301 commands external signaling channel receiver 310 to scan all possible signaling channels belonging to any and all MTSOs normally serving the geographic vicinity, recording the channel identity and the system identity of each signaling channel. System control 301 then commands internal system signaling channel transmitter-receiver 320 to the first such channel, causing the internal system signaling channel transmitter-receiver 320 to radiate a signaling channel marker. In most cases internal system signaling channel transmitter-receiver 320 will include in that marker a new system identity that corresponds to a unique identity; in other cases, internal system signaling channel transmitter-receiver 320 may radiate (while it is on that specific channel) the identity of the ordinary system the system signaling channel transmitter-receiver 320 is supplanting.

When the internal system signaling channel transmitter-receiver 320 radiates the identity of the ordinary system that it is supplanting, the internal system signaling channel transmitter-receiver 320 will give the handsets 171 that have registered to that channel time for their internal decoders to stabilize on the new signal. The internal system signaling channel transmitter-receiver 320 will then transmit a "new signaling channel assignment" message, sending the handsets 171 to a new capture channel, where the internal system signaling channel transmitter-receiver 320 will already be radiating the appropriate signal to keep the handsets 171 locked to the new capture channel.

The internal system signaling channel transmitter-receiver 320 then ceases radiating on the first channel, and proceeds to the second external signaling channel previously recorded. The internal system signaling channel transmitter-receiver 320 repeats the above process, sending the handset 171 registered there to its capture channel, joining those already captured. The internal system signaling channel transmitter-receiver 320 repeats this process for all the external signaling channels previously located. In order to capture new handsets 171 entering the filtered wireless zone, and to compensate for the external MTSOs changing signaling channels, the internal system signaling channel transmitter-receiver 320 continues to repeat the scanning and sequential capturing processes.

When a handset 171 that has been so captured attempts to place a call to the PSTN 101, system control 301 replies to the request for call signal with an all trunks busy message, thereby blocking the call attempt; however, if the call is an emergency call (911 in the US), the call is routed to an emergency call line 305, so that emergency calls may be properly handled. This is in accordance with the processing of unregistered 'foreign' handsets 171 by any ordinary MTSO 110.

When a handset 171 is captured in accordance with the present invention, the normally associated MTSO 110 will realize that the handset 171 is not available, just as though the phone had entered a dead zone or had its power switch turned off. Therefore, when a call for that handset 171 is received from the PSTN 101, the call will be routed to the voice-mail or other processing, as previously configured for that handset 171.

Figure 4:
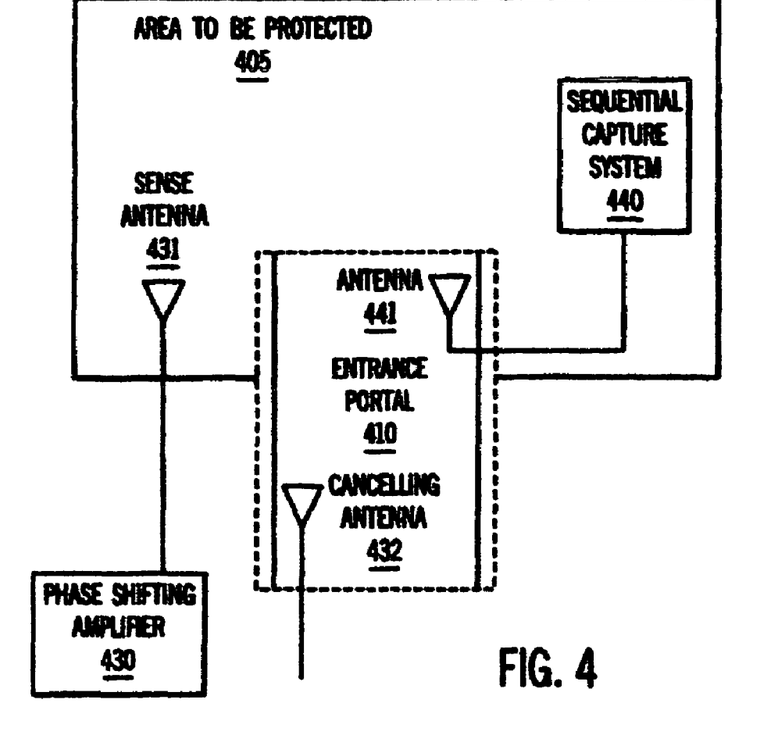
FIG. 4 shows an alternative method of capturing control of handsets in the filtered wireless zone of FIG. 3.

Referring now to FIG. 4, an alternative method of capturing control of handsets is described. This alternative method is applicable to situations where handset 171 users always enter a filtered wireless zone 405 through one or a few specific entryways or portals 410. Such entryway 410 is constructed with wall material that attenuates the received RF energy from the outside cellular system or systems. An internal antenna 441 for the system in accordance with the present invention 440 (which is as described above) is placed within the shielded portal area. Therefore, when entering filtered wireless zone 405, the handsets 171 lose contact with the outside network on which the handsets 171 were formerly registered, and search for and find the signaling channel of the present invention 440, and so are captured as described previously.

In another embodiment, the attenuation within the entryway portal may be obtained by active cancellation rather then by shielding. This is also shown in FIG. 4. RF energy from the outside cellular network or networks is received by sense antenna 431, amplified and phase-controlled by amplifier 430, and radiated by canceling antenna 432. The gain and phase shift of amplifier 430 are adjusted so as to cancel the ambient signal from the outside cellular system within the entry portal, thereby providing the necessary attenuation to cause entering handsets 171 to lose communication with the system to which the handsets 171 were previously registered, to search for a new signaling channel.

Figure 5:
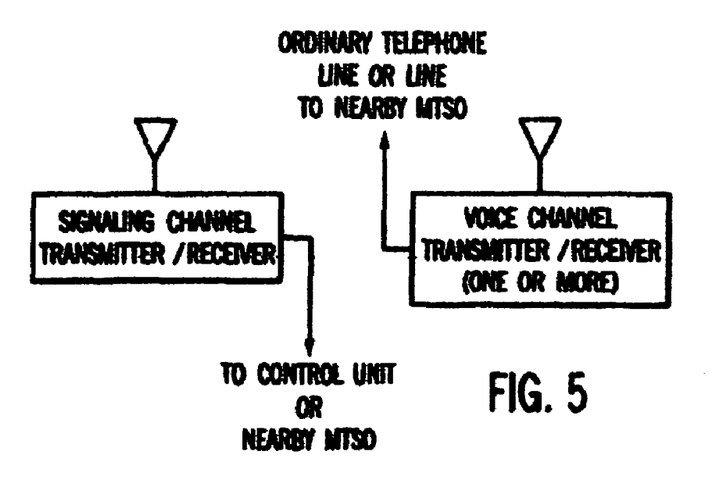
FIG. 5 shows a "virtual phone booth" with in the filtered wireless zone.

It is also possible to create a "virtual phone booth" within the controlled area. In one embodiment, a set of transmitter-receivers as shown in FIG. 5 can be configured so that they cover a very limited geographic area. This limited geographic area could be for example a "phone booth" within the controlled area where cellular calls are permitted. The signaling-channeling transmitter receiver function (under control of the control unit or a nearby MTSO) to register any handset that may be carried into the virtual phone booth. These handsets, once identified as being within the allowed area, are then allowed to place normal calls via the associated voice channel transmitter-receiver sets. Note that these calls may—in the case of control by the local control unit—be placed over an ordinary telephone line or—in the case of control by a MTSO—over a line to that MTSO. In addition, in one embodiment—most usually in the case of control by a MTSO—handsets identified as being within the allowed area can be allowed to receive normal calls.

Limiting of the covered area can be done by careful control of the power level of the transmitters concerned, along with techniques of radio propagation design that are know to one skilled in the art.

Thus, a filtered wireless zone is provided in accordance with the principles of the present invention. Because a filtered wireless zone in accordance with the present invention does not jam, it should not be in violation of the Communications Act of 1934 ("Act"). See 47 U.S.C. § 301, 302a, 333. Likewise, in jurisdictions outside the United State that prohibit use of jamming systems, a filtered wireless zone in accordance with the present invention should be permitted.

While the invention has been described with specific embodiments, other alternatives, modifications and variations will be apparent to those skilled in the art. For example, a filtered wireless zone in accordance with the principles of the present invention anticipates use with various signal types, such as, for example, Frequency Division Multiple Access (FDMA), Time Division Multiple Access (TDMA), Code Division Multiple Access (CDMA), Global System for Mobile Communications (GSM), etc., and other wireless communication such as standard transmission control protocol/internet protocol (TCP/IP). All such alternatives, modifications and variations are intended to be included within the spirit and scope of the appended claims.

What is claimed is:

1. A filtered wireless zone comprising:
  a system control connected to a signaling channel receiver outside the filtered wireless zone and a system signaling channel transmitter-receiver within the filtered wireless zone;
  the signaling channel receiver arranged to receive a signaling channel of one or more cell sites in a geographic vicinity;
  the system signaling channel transmitter-receiver arranged to cover the filtered wireless zone with a signal;
  a signal channeling marker signal transmitted by the system signaling channel transmitter-receiver in the filtered wireless zone; and
  a new signaling channel assignment message transmitted by the system signaling channel transmitter-receiver in the filtered wireless zone, thereby sending handsets to a new capture channel;

whereby when a handset has been so captured a call for that handset is routed to voice-mail or other processing, as previously configured for that handset;

further whereby when a handset that has been so captured attempts to place a call, the call attempt is blocked;

further whereby if a handset that has been so captured attempts to place an emergency call, the call is routed to an emergency call line.

2. The filtered wireless zone of claim 1 further wherein the signaling channel receiver is arranged to receive the signaling channel of all cell sites in the geographic vicinity.

3. The filtered wireless zone of claim 1 further wherein the signaling channel receiver is arranged to receive the signaling channel of one or more mobile telephone switching offices in the geographic vicinity.

4. The filtered wireless zone of claim 1 further wherein the signal channeling marker signal comprises a new system identity that corresponds to a unique identity.

5. The filtered wireless zone of claim 1 further wherein the signal channeling marker signal comprises the identity of the ordinary system it is supplanting.

6. The filtered wireless zone of claim 1 further wherein the strength of the signal arranged to cover the filtered wireless zone is higher than signal strengths normally received in the filtered wireless zone.

7. The filtered wireless zone of claim 6 further wherein the higher strength of the signal is extended by using a plurality of tunable system signaling channel transmitter-receivers.

8. The filtered wireless zone of claim 6 further wherein the higher strength of the signal is achieved by attenuating the received energy from outside systems.

9. The filtered wireless zone of claim 8 further wherein attenuation is obtained by shielding.

10. The filtered wireless zone of claim 8 further wherein further wherein attenuation is obtained by active cancellation.

11. The filtered wireless zone of claim 1 further comprising a signaling channel priority structure.

12. The filtered wireless zone of claim 11 further wherein the signaling channel priority structure comprises assigning a priority flag to the data stream emitted by each signaling channel.

13. The filtered wireless zone of claim 1 further including a signal transmitted by the system signaling channel transmitter-receiver in the filtered wireless zone to keep the handsets locked to the new capture channel.

14. The filtered wireless zone of claim 1 further wherein the transmitter-receiver ceases radiating on the channel and proceeds to another channel, sending the handset registered there to its capture channel, joining those already captured.

15. The filtered wireless zone of claim 14 further wherein the transmitter-receiver ceases radiating on a channel and proceeds to another channel for all the external signaling channels previously located.

16. The filtered wireless zone of claim 1 further wherein the transmitter-receiver repeats the scanning and sequential capturing processes.

17. The filtered wireless zone of claim 1 further wherein the signal comprises Frequency Division Multiple Access (FDMA) signals.

18. The filtered wireless zone of claim 1 further wherein the signal comprises Time Division Multiple Access (TDMA) signals.

19. The filtered wireless zone of claim 1 further wherein the signal comprises Code Division Multiple Access (CDMA) signals.

20. The filtered wireless zone of claim 1 further wherein the signal comprises Global System for Mobile Communications (GSM) signals.

21. The filtered wireless zone of claim 1 further wherein the signal comprises transmission control protocol/internet protocol (TCP/IP) signals.

22. The filtered wireless zone of claim 1 further comprising a signal notifying an identified handset regarding the filtered wireless zone.

23. The filtered wireless zone of claim 1 further wherein the zone is stationary.

24. The filtered wireless zone of claim 1 further wherein the zone is outdoors.

25. The filtered wireless zone of claim 1 further wherein the zone is mobile.

26. A method of creating a filtered wireless zone comprising:

scanning signaling channels serving a geographic vicinity;

recording channel identity and system identity of each signaling channel;

commanding a transmitter-receiver to such channel, causing the transmitter-receiver to radiate a signaling channel marker; and transmitting a new signaling channel assignment message, sending handsets to a new capture channel;

whereby when a handset has been so captured a call for that handset will be routed to the voice-mail or other processing, as previously configured for that handset;

further whereby when a handset that has been so captured attempts to place a call, the call attempt is blocked;

further whereby when a handset that has been so captured places an emergency call, the call is routed to an emergency call line.

27. The method of creating a filtered wireless zone of claim 26 further wherein the step of causing the transmitter-receiver to radiate a signaling channel marker comprises including in that marker a new system identity that corresponds to a unique identity.

28. The method of creating a filtered wireless zone of claim 26 further wherein the step of causing the transmitter-receiver to radiate a signaling channel marker comprises including in that marker the identity of the ordinary system it is supplanting.

29. The method of creating a filtered wireless zone of claim 26 further including the transmitter-receiver ceasing radiating on the channel and proceeding to another channel, sending the handset registered there to its capture channel, joining those already captured.

30. The method of creating a filtered wireless zone of claim 29 further including repeating the step of the transmitter-receiver ceasing radiating on a channel and proceeding to another channel, sending the handset registered there to its capture channel, joining those already captured.

31. The method of creating a filtered wireless zone of claim 26 further including the transmitter-receiver continuing to repeat the scanning and sequential capturing processes.

32. The method of creating a filtered wireless zone of claim 26 further including ensuring the strength of the signals are higher than signal strengths normally serving the filtered wireless zone.

33. The method of creating a filtered wireless zone of claim 32 further wherein the step of ensuring the strength of the signals are higher than signal strengths normally serving the filtered wireless zone comprises a plurality of tunable system signaling channel transmitter-receivers.

34. The method of creating a filtered wireless zone of claim 32 further including attenuating the received energy from outside systems.

35. The method of creating a filtered wireless zone of claim 34 further wherein the step of attenuating the received energy from outside systems is obtained by shielding.

36. The method of creating a filtered wireless zone of claim 34 further wherein the step of attenuating the received energy from outside systems is obtained by active cancellation.

37. The method of creating a filtered wireless zone of claim 26 further comprising providing a signaling channel priority structure.

38. The method of creating a filtered wireless zone of claim 37 further assigning a priority flag to the data stream emitted by each signaling channel.

39. The method of creating a filtered wireless zone of claim 26 further including radiating a signal to keep the handsets locked to the new capture channel.

40. The method of creating a filtered wireless zone of claim 26 further including the signal comprising Frequency Division Multiple Access (FDMA) signals.

41. The method of creating a filtered wireless zone of claim 26 further including the signal comprising Time Division Multiple Access (TDMA) signals.

42. The method of creating a filtered wireless zone of claim 26 further including the signal comprising Code Division Multiple Access (CDMA) signals.

43. The method of creating a filtered wireless zone of claim 26 further including the signal comprising Global System for Mobile Communications (GSM) signals.

44. The method of creating a filtered wireless zone of claim 26 further including the signal comprising transmission control protocol/internet protocol (TCP/IP) signals.

45. The method of creating a filtered wireless zone of claim 26 further comprising notifying an identified handset regarding the filtered wireless zone.

46. The method of creating a filtered wireless zone of claim 26 further comprising establishing the zone as stationary.

47. The method of creating a filtered wireless zone of claim 26 further comprising establishing the zone as outdoors.

48. The method of creating a filtered wireless zone of claim 26 further comprising establishing the zone as mobile.

* * * * *

UNITED STATES PATENT AND TRADEMARK OFFICE
CERTIFICATE OF CORRECTION

PATENT NO. : 7,236,766 B2  
APPLICATION NO. : 11/095867  
DATED : June 26, 2007  
INVENTOR(S) : Thomas A. Freeburg Page 1 of 1

It is certified that error appears in the above-identified patent and that said Letters Patent is hereby corrected as shown below:

Title page, item (73) Assignee: please change "Tylu Wireless Technologies, LLC" to -- Tylu Wireless Technology, LLC --.

Signed and Sealed this

Thirteenth Day of October, 2015

Michelle K. Lee  
*Director of the United States Patent and Trademark Office*